United States Patent
Matsubara et al.

(10) Patent No.: US 7,126,300 B2
(45) Date of Patent: Oct. 24, 2006

(54) MOTOR DRIVE SYSTEM

(75) Inventors: Shunsuke Matsubara, Yamanashi (JP); Mamoru Yaeshima, Hadano (JP)

(73) Assignee: Fanuc LTD, Yamanashi (JP)

( * ) Notice: Subject to any disclaimer, the term of this patent is extended or adjusted under 35 U.S.C. 154(b) by 239 days.

(21) Appl. No.: 10/851,087

(22) Filed: May 24, 2004

(65) Prior Publication Data

US 2004/0239271 A1    Dec. 2, 2004

(30) Foreign Application Priority Data

May 27, 2003  (JP)  .............................. 2003-149365

(51) Int. Cl.
*H02P 7/42* (2006.01)
(52) U.S. Cl. ...................... 318/434; 318/430; 318/432; 318/439
(58) Field of Classification Search ................ 318/430, 318/432, 434, 439
See application file for complete search history.

(56) References Cited

U.S. PATENT DOCUMENTS

| | | | | |
|---|---|---|---|---|
| 4,893,479 | A * | 1/1990 | Gillett et al. | 62/213 |
| 5,123,080 | A * | 6/1992 | Gillett et al. | 388/811 |
| 5,371,645 | A * | 12/1994 | Mochizuki | 361/22 |
| 5,530,788 | A * | 6/1996 | Saijima | 388/811 |
| 5,600,233 | A * | 2/1997 | Warren et al. | 323/237 |
| 6,313,593 | B1 * | 11/2001 | Matsubara et al. | 318/434 |
| 6,324,038 | B1 * | 11/2001 | Kishibe et al. | 361/31 |
| 6,392,966 | B1 * | 5/2002 | Kamiyama | 369/44.28 |
| 6,760,237 | B1 * | 7/2004 | Tsuji et al. | 363/55 |
| 2002/0128106 | A1 * | 9/2002 | Kitamura | 475/2 |
| 2003/0227730 | A1 * | 12/2003 | Iimura et al. | 361/93.1 |
| 2004/0008457 | A1 * | 1/2004 | Iimura et al. | 361/18 |

FOREIGN PATENT DOCUMENTS

| JP | 62-244222 | 10/1987 |
|---|---|---|
| JP | 6-141550 | 5/1994 |
| JP | 2001-192112 | 7/2001 |

OTHER PUBLICATIONS

Notice of Reasons for Rejection dated Aug. 19, 2005.

* cited by examiner

*Primary Examiner*—Paul Ip
(74) *Attorney, Agent, or Firm*—Staas & Halsey LLP

(57) ABSTRACT

A first and a second motor drive amplifiers connected to a motor drive power supply include a first and a second memories which store specifications of the amplifiers, respectively. A memory provided in a power supply unit stores an overcurrent detection value for detecting an overcurrent according to the specifications of the respective motor drive amplifiers. A microcontroller reads the specifications from the first and second memories, and integrates overcurrent detection values corresponding to the respective specifications. If a current sensor detects that a current exceeding a reference value calculated based on a set integrated value, the current sensor outputs an overcurrent detection signal.

2 Claims, 2 Drawing Sheets

MOTOR DRIVE SYSTEM

BACKGROUND OF THE INVENTION

1. Field of the Invention

The present invention relates to a motor drive system in which a plurality of motor drive amplifiers are connected to one motor drive power supply to thereby drive respective motors.

2. Description of the Related Art

There is known a motor drive system in which a plurality of motor drive amplifiers for driving motors, respectively, are connected to a motor drive power supply to thereby supply a power to the respective motor drive amplifiers from one motor drive power supply, and in which the motor drive power supply is shared among the amplifiers.

In the motor drive system in which the motor drive power supply is shared among the respective motor drive amplifiers, various overcurrent detection values (currents to be detected as an overcurrent) are set in overcurrent detection means for detecting overcurrent, corresponding to the number of the motor drive amplifiers connectable to the motor drive power supply.

As various overcurrent detection values (the currents to be detected as the overcurrent) are set in the overcurrent detection means for detecting the overcurrent by detecting a current flowing in the motor drive power supply, corresponding to the maximum number of motor drive amplifiers connectable to the motor driver power supply, in case where a smaller number of motor drive amplifiers than the maximum number of connectable motor drive amplifiers are connected to the motor drive power supply, if an overcurrent actually occurs to one of the motor drive amplifiers, then occurrence of the overcurrent cannot be detected, with the result that an excessive energy is supplied to a portion in which the overcurrent occurs. In consequence, components located in the portion may possibly be broken, and damages such as smoke emission and ignition may possibly occur to the components.

SUMMARY OF THE INVENTION

The present invention relates to a motor drive system which comprises a motor drive power supply and a plurality of motor drive amplifiers connected to the motor drive power supply, and drives motors by the respective motor drive amplifiers. The motor drive system further comprises overcurrent detection means for detecting a current flowing in the motor drive power supply, wherein an overcurrent detection value detected as an overcurrent by the overcurrent detection means can be changed.

Specifically, the motor drive amplifiers comprise memories that store specifications of the respective motor drive amplifiers. The motor drive system further comprises: means for reading storage contents of the memories; overcurrent detection value storage means for storing overcurrent detection values corresponding to the specifications of the respective motor drive amplifiers; and means for reading the overcurrent detection values from the overcurrent detection value storage means based on the specifications read from the respective memories, and then integrating the overcurrent detection values. An integrated value of the overcurrent detection values of the plurality of motor drive amplifiers connected to the motor drive power supply is a value to be detected by the overcurrent detection means.

BRIEF DESCRIPTION OF THE DRAWINGS

These and other objects and features of the present invention will become apparent from the following detailed descriptions of the embodiments with reference to the accompanying drawings, in which.

DESCRIPTION OF THE EMBODIMENTS

Figure 1:
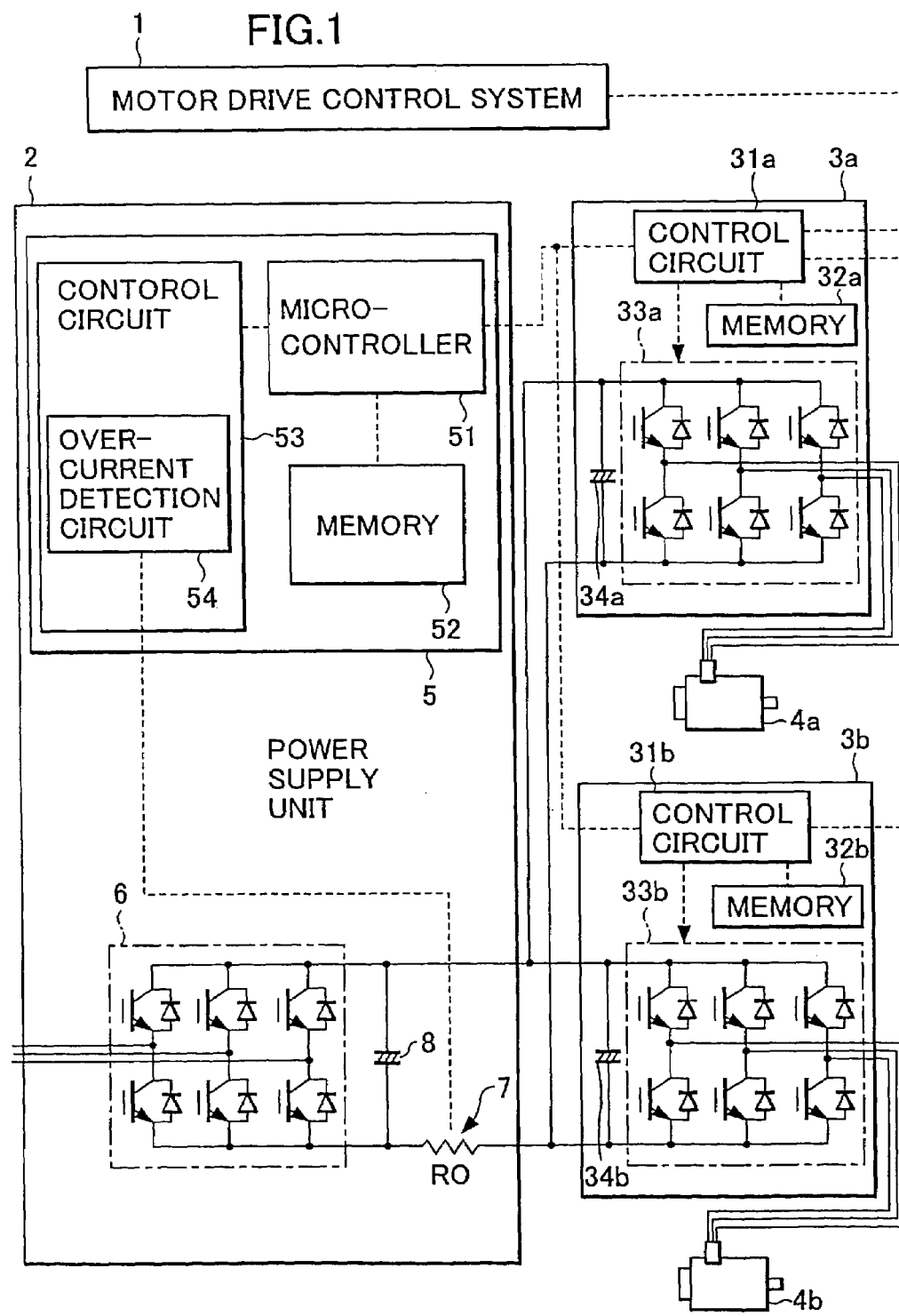
FIG. 1 is a block diagram of a motor drive system according to one embodiment of the present invention.

FIG. 1 is a block diagram of a motor drive system according to one embodiment of the present invention. In FIG. 1, reference numeral 1 denotes a motor drive controller such as a numeric control device, reference numeral 2 denotes a power supply units, reference symbols 3a and 3b denote motor drive amplifiers, and reference symbols 4a and 4b denote motors. The motor drive controller 1 is connected to control circuits 31a and 31b for controlling inverter circuits 33a and 33b provided in the motor drive amplifiers 3a and 3b, respectively, by daisy chaining. The inverter circuits 33a and 33b in the respective motor drive amplifiers 3a and 3b are connected to a motor drive power supply 6 provided in the power supply unit 2. In FIG. 1, a drive power line is indicated by a solid line, and a control signal line is indicated by a broken line.

The power supply unit 2 includes a power supply unit control circuit 5. The power supply unit control circuit 5 includes a microcontroller 51, a memory 52 connected to the microcontroller 51, and a control circuit 53 connected to the microcontroller 51. The control circuit 53 includes an overcurrent detection circuit 54 which detects an overcurrent from a current detected by a current sensor 7 which detects the current flowing in a motor drive power supply 6. The current sensor 7 and the overcurrent detection circuit 54 constitute overcurrent detection means.

The motor drive power supply 6 is a converter which converts a three-phase alternating current into a direct current. In FIG. 1, the motor drive power supply 6 is a converter (a rectifier circuit) including switching elements so as to allow regenerative current to be fed back. Reference numeral 8 denotes a smoothing capacitor. A plurality of motor drive amplifiers can be connected to this motor drive power supply 6. FIG. 1 depicts an example in which the two motor drive amplifiers 3a and 3b are connected to the motor drive power supply 6.

The motor drive amplifier 3a is identical with the motor drive amplifier 3b in configuration. The motor drive amplifiers 3a and 3b are comprised of control circuits 31a and 31b, memories 32a and 32b connected to the control circuits 31a and 31b, inverter circuits 33a and 33b controlled by the control circuits 31a and 31b, and smoothing capacitors 34a and 34b, respectively. The output side of the inverter circuits 33a and 33b are connected to the motors 4a, 4b, respectively.

The control circuits 31a and 31b in the respective motor drive amplifiers 3a and 3b are connected to the microcontroller 51 provided in the power supply unit control circuit 5 in the power supply unit 2, respectively.

Each of the memories 32a and 32b in the respective motor drive amplifiers 3a and 3b stores specification information such as a product name, a product number, and a production date (year, month, and day) for specifying its own motor drive amplifier. The memory 52 in the power supply unit control circuit 5 stores a maximum current allowed by each motor drive amplifier under specifications of the amplifier, that is, an overcurrent detection value to be detected as an overcurrent. Thus, the memory 52 constitutes overcurrent detection value storage means.

When power is supplied to the entire motor drive controller or the like, the microcontroller 51 reads the specifications of the motor drive amplifiers stored in the memories 32a and 32b of the respective motor drive amplifiers 3a and 3b, reads, from the memory 52 in the power supply unit control circuit 5, overcurrent detection values corresponding to the respective read specifications, integrates the values, and sets a resultant integrated value to the overcurrent detection circuit 54 as an integrated overcurrent detection value.

Figure 2:
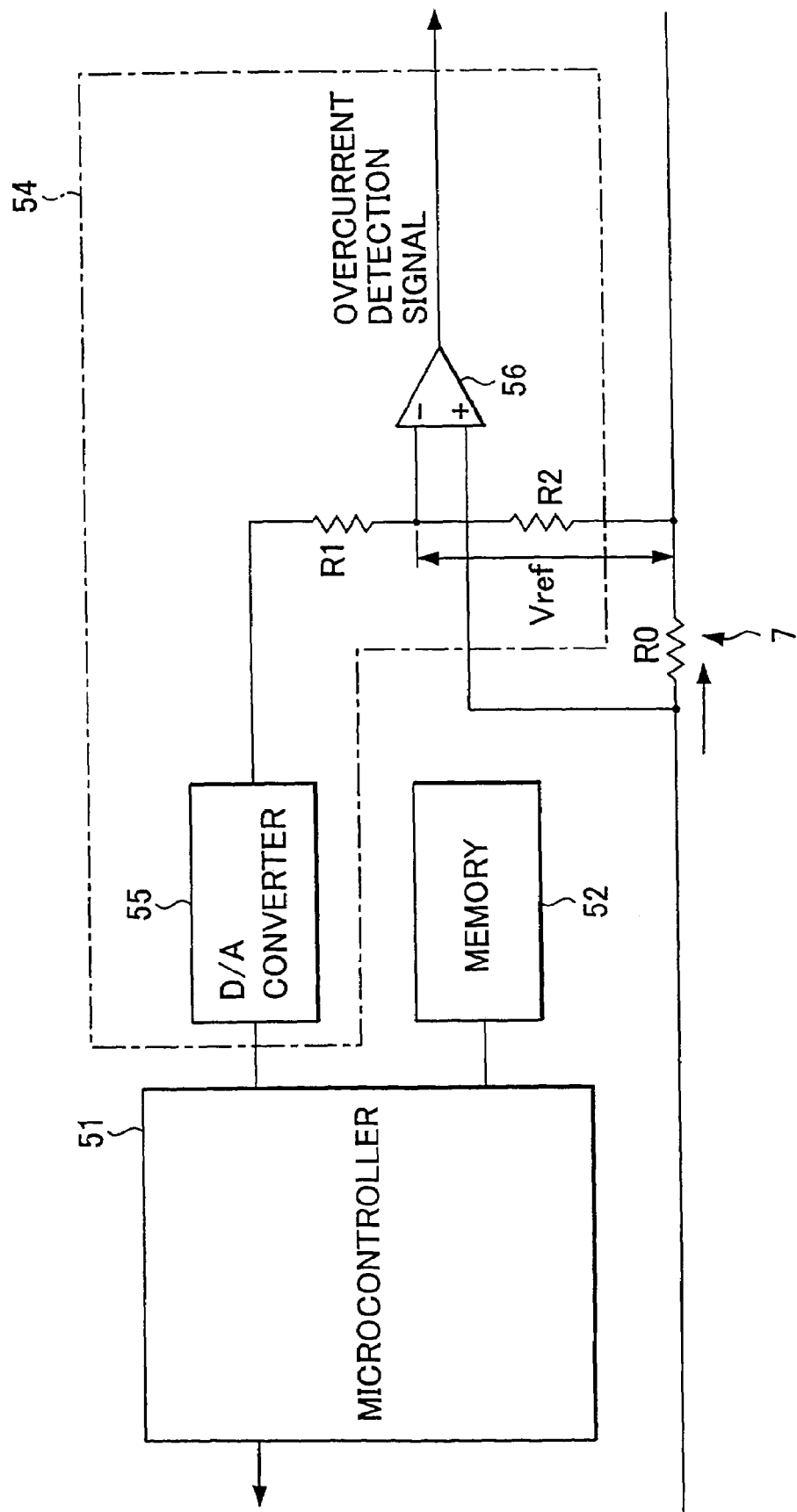
FIG. 2 depicts a detail of an overcurrent detection circuit in the motor drive system shown in FIG. 1.

FIG. 2 depicts a detail of the overcurrent detection circuit 54. The overcurrent detection circuit 54 is composed of a D/A converter 55, resistances R1 and R2, and a comparator 56. It is noted that the microcontroller 51, the memory 52, and a resistance R0 that constitutes the current sensor 7, shown in FIG. 2, are identical with those shown in FIG. 1, respectively.

The microcontroller 51 integrates the overcurrent detection values of the respective motor drive amplifiers 3a and 3b as stated above, and outputs the integrated value to the D/A converter 55. The D/A converter 55 converts this integrated overcurrent detection value into an analog voltage, and applies the voltage to a serial circuit of the resistances R1 and R2. The analog voltage corresponding to the integrated overcurrent detection value is divided by the resistances R1 and R2, and a resultant divided voltage is inputted to the comparator 56 as an overcurrent detection reference value Vref.

The current flowing in the motor drive power supply 6 flows in the resistance R0 (current sensor 7), and a voltage drop caused by the resistance R0 is inputted to the other terminal of the comparator 56. If the voltage drop caused by the resistance R0 exceeds the overcurrent detection reference value Vref, a high-level overcurrent detection signal is outputted from the comparator 56.

The motor drive controller 1 transmits a drive command to the respective motor drive amplifiers 3a and 3b. In response to the drive command, the control circuits 31a and 31b in the motor drive amplifiers 3a and 3b control on-off of the switching elements of the inverter circuits 33a and 33b, respectively. As a result, the power supplied from the motor drive power supply 6 is supplied to the motors 4a and 4b via the inverter circuits 33a and 33b, thereby driving the motors 4a and 4b, respectively.

A sum of the current flowing in the motor drive amplifier 3a and that flowing in the motor drive amplifier 3b flows in each of the motor drive power source 6 and the resistance R0 of the current sensor 7. The sum of current is detected by the current sensor 7 as stated above. Accordingly, if an overcurrent flows in one of the motor drive amplifiers 3a and 3b, then the current flowing in the resistance R0 of the current sensor 7 also increases, the voltage drop of the resistance R0 exceeds the overcurrent detection reference value Vref, and the overcurrent detection signal is outputted from the comparator 56.

This overcurrent detection reference value Vref is set based on the integrated value of the overcurrent detection values that are the maximum currents allowed by the respective motor drive amplifiers connected to the motor drive power supply (in the example of FIG. 1, Vref is set based on the sum of the overcurrent detection value of the motor drive amplifier 3a and that of the motor drive amplifier 3b). Therefore, if the number of the motor drive amplifiers connected to the motor drive power supply 6 changes, or if the motor drive amplifier under different specifications is used and the overcurrent detection value of the amplifier thereby changes, then the integrated overcurrent detection value to be set to the overcurrent detection circuit 54 can be changed, with the result that the overcurrent detection reference value Vref can be changed accordingly. It is thus possible to accurately detect the overcurrent.

According to the present invention, in the motor drive system in which a plurality of motor drive amplifiers are connected to the motor drive power supply, the overcurrent detection value corresponding to the overcurrent detected by the overcurrent detection means is set according to the number of the connected motor drive amplifiers and the specifications of the respective amplifiers. Therefore, the overcurrent can be appropriately detected.

The invention claimed is:

1. A motor drive system, comprising:
a motor drive power supply and a plurality of motor drive amplifiers connected to the motor drive power supply, and driving motors by the respective motor drive amplifiers, the motor drive system comprising:
overcurrent detection means for detecting a current flowing in said motor drive power supply;
wherein said motor drive amplifiers comprise memories that store specifications of the respective motor drive amplifiers;
means for reading storage contents of said memories;
overcurrent detection value storage means for storing overcurrent detection values corresponding to the specifications of the respective motor drive amplifiers; and
means for reading the overcurrent detection values from the overcurrent detection value storage means based on the specifications read from said respective memories, and for integrating the overcurrent detection values,
wherein an overcurrent detection value to be detected as an overcurrent by said overcurrent detection means can be changed; and
wherein an integrated value of the overcurrent detection values of the plurality of motor drive amplifiers connected to said motor drive power supply is set as a reference value for detection made by said overcurrent detection means.

2. A motor control device comprising:
a plurality of motor drive amplifiers connected to a motor drive power supply;
allowable current storage means for storing information on maximum currents allowed by the respective motor drive amplifiers;
allowable current reading means for reading the information on the maximum currents allowed by the respective motor drive amplifiers from said allowable current storage means;
reference value setting means for integrating the allowed maximum currents of the respective motor drive amplifiers, read by said allowable current reading means, and for setting a reference value for overcurrent detection based on an integrated value;
supply current detection means for detecting a sum of currents supplied from said motor drive power supply to said plurality of motor drive amplifiers, respectively; and
overcurrent detection means for comparing the sum of current detected by said supply current detection means with the reference value set by said reference value setting means, and for detecting an overcurrent based on a comparison result.

* * * * *

UNITED STATES PATENT AND TRADEMARK OFFICE
CERTIFICATE OF CORRECTION

| | |
|---|---|
| PATENT NO. | : 7,126,300 B2 |
| APPLICATION NO. | : 10/851087 |
| DATED | : October 24, 2006 |
| INVENTOR(S) | : Shunsuke Matsubara et al. |

It is certified that error appears in the above-identified patent and that said Letters Patent is hereby corrected as shown below:

In the drawings:

Fig. 1, change "CONTOROL" to --CONTROL--.

Signed and Sealed this

First Day of May, 2007

JON W. DUDAS
*Director of the United States Patent and Trademark Office*